(12) United States Patent
Nashida et al.

(10) Patent No.: US 8,181,214 B2
(45) Date of Patent: May 15, 2012

(54) RECORDING SYSTEM AND RECORDING SUBSTITUTION SYSTEM

(75) Inventors: Tatsushi Nashida, Kanagawa (JP);
Naoto Ozaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1603 days.

(21) Appl. No.: 09/870,296

(22) Filed: May 30, 2001

(65) Prior Publication Data

US 2002/0013945 A1 Jan. 31, 2002

(30) Foreign Application Priority Data

May 31, 2000 (JP) ................................. 2000-162320

(51) Int. Cl.
*H04N 7/173* (2011.01)
(52) U.S. Cl. ..................... 725/115; 725/145; 386/295
(58) Field of Classification Search .................. 725/234, 725/58, 92, 114, 115, 144, 145, 34; 386/295
See application file for complete search history.

(56) References Cited

U.S. PATENT DOCUMENTS

| | | | |
|---|---|---|---|
| 5,751,282 A | | 5/1998 | Girard et al. |
| 5,774,170 A * | | 6/1998 | Hite et al. .......................... 725/34 |
| 5,805,763 A * | | 9/1998 | Lawler et al. ..................... 386/83 |
| 6,311,011 B1 * | | 10/2001 | Kuroda ........................... 386/46 |
| 6,678,462 B1 * | | 1/2004 | Chihara .......................... 386/83 |
| 6,698,020 B1 * | | 2/2004 | Zigmond et al. ................. 725/34 |
| 7,124,432 B2 * | | 10/2006 | Hanai et al. ..................... 725/142 |
| 2001/0046366 A1 * | | 11/2001 | Susskind ......................... 386/46 |
| 2002/0046407 A1 * | | 4/2002 | Franco .......................... 725/110 |
| 2002/0118954 A1 * | | 8/2002 | Barton et al. .................... 386/83 |
| 2003/0149988 A1 * | | 8/2003 | Ellis et al. ........................ 725/87 |
| 2005/0273819 A1 * | | 12/2005 | Knudson et al. ................. 725/58 |
| 2006/0204225 A1 * | | 9/2006 | Chung et al. .................... 386/95 |

FOREIGN PATENT DOCUMENTS

| | | |
|---|---|---|
| EP | 0 665 551 | 8/1995 |
| EP | 0 975 163 | 1/2000 |
| JP | 11-346354 | 12/1999 |
| WO | WO 99 45702 | 9/1999 |
| WO | WO 00 04706 | 1/2000 |

OTHER PUBLICATIONS

Japanese Office Action 2000-162320.

* cited by examiner

*Primary Examiner* — Farzana Hossain
(74) *Attorney, Agent, or Firm* — Frommer Lawrence & Haug LLP; Willaim S. Frommer; Ellen Marcie Emas (57) ABSTRACT

A recording center station includes functions for receiving a broadcast wave and saving or recording received data. In response to a request from each receiving station, the recording center station substitutionally records a specified broadcast program and provides a recorded content. There may be the case where the receiving station cannot record a reserved program independently due to insufficient free space remaining in a recording medium or a recording apparatus failure. In this case, the receiving station can automatically issue a recording substitution request to the recording center station for substitution of the program recording.

9 Claims, 6 Drawing Sheets

RECORDING SYSTEM AND RECORDING SUBSTITUTION SYSTEM

BACKGROUND OF THE INVENTION

1. Technical Field

The present invention relates to a system for recording a video content. More specifically, the present invention concerns a program reservation and recording system and a recording substitution system for reserving and recording TV programs which are broadcast as scheduled.

Much more specifically, the present invention relates to a program reservation and recording system and a recording substitution system for servicing reliability of reserved program recording. Particularly, the present invention concerns a program reservation and recording system and a recording substitution system for servicing reserved program recording even if no recording is available due to an insufficient capacity in an audience's recording medium.

2. Prior Art

A television set became one of the necessities of daily life a long time ago. In addition to television sets, a video apparatus for recording broadcast programs has come to be widely used. Recently, a multi-channel approach is developing rapidly along with the introduction of satellite broadcasting and cable television, there is an increasing need for the capability of reserving programs preferred by the audience.

Conventionally, many storage media for recording TV programs employ the sequential access method such as video tape. Recently, with the development of the digital technology and large-sized hard disc drives (HDDs), HDD-based recording devices have become available. These trends are reported in journals such as, say, "Increasingly marketing devices for recording TV programs on HDDs" (Nikkei Electronics, No. 727, pp. 27-28, 1998) and "Digital recording technology using HDDs available for home use" (Nikkei Electronics, No. 727, pp. 41-46, 1998).

When a large-size recording medium is used for recording programs, it is possible to record a series of dramas for weeks or a plurality of programs in the same time zone for reservation without needing to know the remaining capacity of the recording medium. By contrast, however, reserving a great number of programs may easily cause unsuccessful recording due to incorrect understanding of the remaining storage capacity.

It was often the case that a video tape cassette with a sufficient recording capacity is found to be unavailable just before the broadcast time of a program to be recorded; the program is not recorded completely because an available size of the video tape becomes insufficient in the middle of the recording; or the recording fails due to a device malfunction or other unexpected events.

Especially, a failure to record an intended program causes a disappointing and inconvenient result for the audience.

BRIEF SUMMARY OF THE INVENTION

It is an object of the present invention to provide an excellent program reservation and recording system and a recording substitution system capable of reserving TV programs which are broadcast as scheduled.

It is another object of the present invention to provide an excellent program reservation and recording system and a recording substitution system capable of servicing reliability of reserved program recording.

It is still another object of the present invention to provide an excellent program reservation and recording system and a recording substitution system capable of servicing reserved program recording even if no recording is available due to an insufficient capacity in an audience's recording medium.

The present invention has been made in consideration of the foregoing. A first aspect thereof is a recording system for recording and/or reserving a broadcast program, comprising: means for accepting a request to record and/or reserve a broadcast program; storage means for recording a broadcast program; connection means for connecting with an external device; determination means for determining whether it is possible to record a broadcast program requested to be recorded and/or reserved; and means for issuing a recording substitution request to an external device via the connection means in response to a negative result of the determination.

In the recording system according to the first aspect of the present invention, the determination means may generate a negative result when the remaining size for the storage means is insufficient for a broadcast program request to be recorded or reserved. Alternatively, the determination means may generate a negative result when a failure in the system prevents the broadcast program from being recorded in the storage means.

A second aspect of the present invention is a recording substitution system for substitutionally recording a broadcast program, comprising: connection means for connecting with an external device; means for receiving a broadcast program; storage means for recording a broadcast program; and recording substitution means for responding to reception of a recording substitution request via the connection means and receiving and recording a corresponding broadcast program in the storage means.

In the recording substitution system according to the second aspect of the present invention, the recording substitution means may receive recording substitution requests from a plurality of external devices and provide many users with a recording substitution service concurrently or parallel. In this case, it is desirable to record and store broadcast programs corresponding to a requesting origin.

The recording substitution system may be provided with user information management means for storing user information about each requesting origin. In this case, the recording substitution means may record a broadcast program or provide a recorded content in a format appropriate for a user attribute of the requesting origin. Further, the recording substitution means may obtain advertising information appropriate for a user attribute of the requesting origin via the connection means and insert this information in a recorded program. In this case, it may be preferable to appropriate part of the advertising proceeds to the recording substitution service charge for returning a profit to users.

The recording substitution system according to the present invention comprises a broadcasting station for providing broadcast services, a receiving station for receiving a broadcast wave, and a recording center station for providing the receiving station with program recording services under certain situations.

The recording center station includes functions of receiving a broadcast wave and saving or recording received data. The recording center station has functions of receiving a broadcast wave and saving or recording received data. In response to a request from each receiving station, the recording center station can substitutionally record specified broadcast programs and provide recorded contents. For example, there may be the case where the receiving station itself cannot record a reserved program because a recording medium leaves no space for recording or a recording apparatus malfunctions. In this case, the receiving station automatically issues a recording substitution request to the recording center station for substituting the program recording.

In response to the recording substitution request, the recording center station receives a specified broadcast program and records the relevant broadcast content. In addition, the recording center station stores the recorded content in correspondence with an account of the requesting receiving station or other user identification information. The recording center station may automatically distribute the recorded content to the requesting origin after expiration of a specified period or distribute the recorded content in response to a download request from the requesting origin.

The recording center station may charge the receiving station for program reservation substitution services, say, at a meter rate corresponding to the recording time. Alternatively, the recording center station may insert advertising information in a recorded content and appropriate part of the advertising proceeds to the recording service charge for a discount.

Embodiments of the present invention will be described in further detail with reference to the accompanying drawings.

As mentioned above, the present invention can provide an excellent program reservation and recording system and a recording substitution system capable of reserving TV programs which are broadcast as scheduled.

Further, the present invention can provide an excellent program reservation and recording system and a recording substitution system capable of servicing reliability of reserved program recording.

Yet further, the present invention can provide an excellent program reservation and recording system and a recording substitution system capable of servicing reserved program recording even if no recording is available due to an insufficient capacity in an audience's recording medium.

DETAILED DESCRIPTION OF THE INVENTION

Embodiments of the present invention will be described in further detail with reference to the accompanying drawings.

Figure 1:
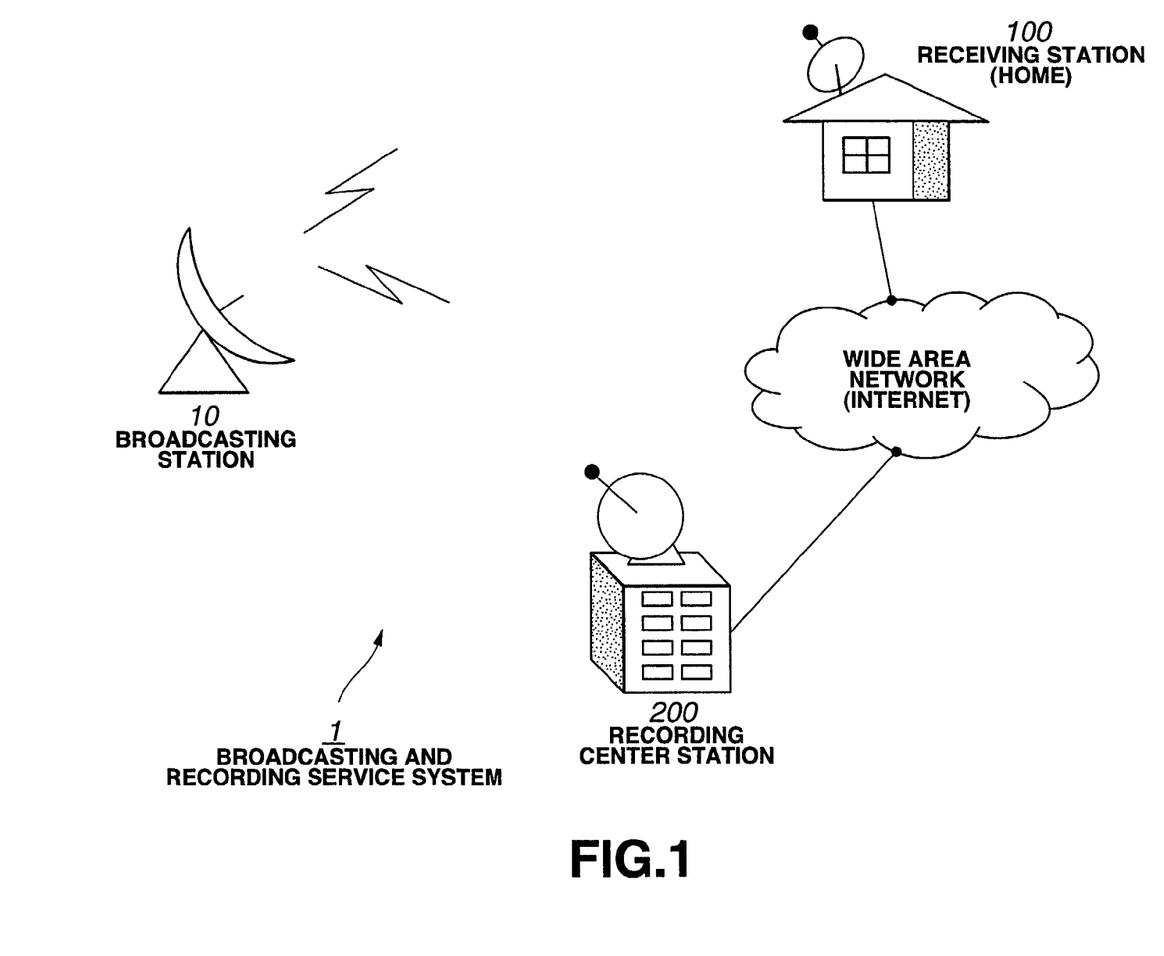
FIG. 1 schematically shows a configuration of a recording service system 1 for broadcasting and broadcast programs according to the present invention.

FIG. 1 schematically shows a configuration of a recording service system 1 for broadcasting and broadcast programs according to the present invention. As shown in this figure, the system 1 comprises a broadcasting station 10, a receiving station 100, and a recording center station 200. The broadcasting station 10 provides broadcasting services. The receiving station 100 receives a broadcast wave for viewing broadcast programs. The recording center station 200 provides the receiving station 100 with program recording services in specific modes.

One or more broadcasting stations 10 scatter on the ground and provide services of distributing broadcast contents according to a specified schedule (program table). For implementing the present invention broadcast contents can be distributed by any means including a surface wave, a satellite wave, a radio wave, and wire broadcasting.

The receiving station 100 corresponds to an ordinary home for audience. Though FIG. 1 shows one receiving station 100, there are many stations on the ground. Basically, the broadcasting station 10 provides unidirectional communication for data distribution or broadcasting.

The receiving station 100 includes functions of receiving a broadcast wave, decoding received data and outputting video and audio information, and saving or recording received data. Recording is available in any data format before or after decoding.

The recording center station 200 connects with one or more receiving stations 100 each other through the intermediation of a wide area network such as Internet or other communication media. When a TCP/IP (Transmission Control Protocol/Internet Protocol) network is used for connection, for example, it is possible to perform requests and responses according to the HTTP (Hyper Text Transfer Protocol) and file or mail transfer operations according to the FTP (File Transfer Protocol) between the receiving station 100 and the recording center station 200.

The recording center station 200 has functions of receiving a broadcast wave and saving or recording received data. In response to a request from each receiving station 100, the recording center station can substitutionally record specified broadcast programs and provide recorded contents.

The recording center station 200 works as a type of content server on the TCP/IP network. It is possible to use a resource identifier in the URL (Uniform Resource Locator) format for specifying the recording center station 200 and a recorded program content publicly presented on this station.

For example, there may be the case where the receiving station 100 itself cannot record a reserved program because a recording medium leaves no space for recording or a recording apparatus malfunctions. In this case, the receiving station automatically issues a recording substitution request to the recording center station 200 for substituting the program recording. The recording substitution can be an HTTP request in the URL format or a mail format.

In response to the recording substitution request, the recording center station 200 receives a specified broadcast program and records the relevant broadcast content. In addition, the recording center station stores the recorded content in correspondence with an account of the requesting receiving station 100 or other user identification information. The stored recorded content can be identified with, say, a URL on the network.

The recording center station 200 may automatically distribute the recorded content to the requesting origin after expiration of a specified period or distribute the recorded content in response to a download request from the requesting origin. The requesting receiving station 100 can specify a content to be recorded using URL and download the recorded content according to the protocol such as HTTP or FTP. The receiving station 100 may request to provide a recorded content by sending a mail message. The recording center station 200 may return the recorded content in an attached file format. Instead of providing recorded contents via a network, the recording center station 200 may distribute these contents by copying them on a CD (Compact Disc) or a DVD (Digital Versatile Disc).

The recording center station 200 may charge the receiving station 100 for program reservation substitution services, say, at a meter rate corresponding to the recording time. Alternatively, the recording center station may insert advertising information in a recorded content and appropriate part of the advertising proceeds to the recording service charge for a discount. It may be also preferable to replace a commercial message inserted in the broadcast program with an advertising content or insert an advertising content in addition to the commercial message. Further, it may be preferable to analyze the user profile based on the contents of recording-requested programs, select advertising contents most appropriate for the user, and attach the selected advertising contents to a recorded content.

Figure 2:
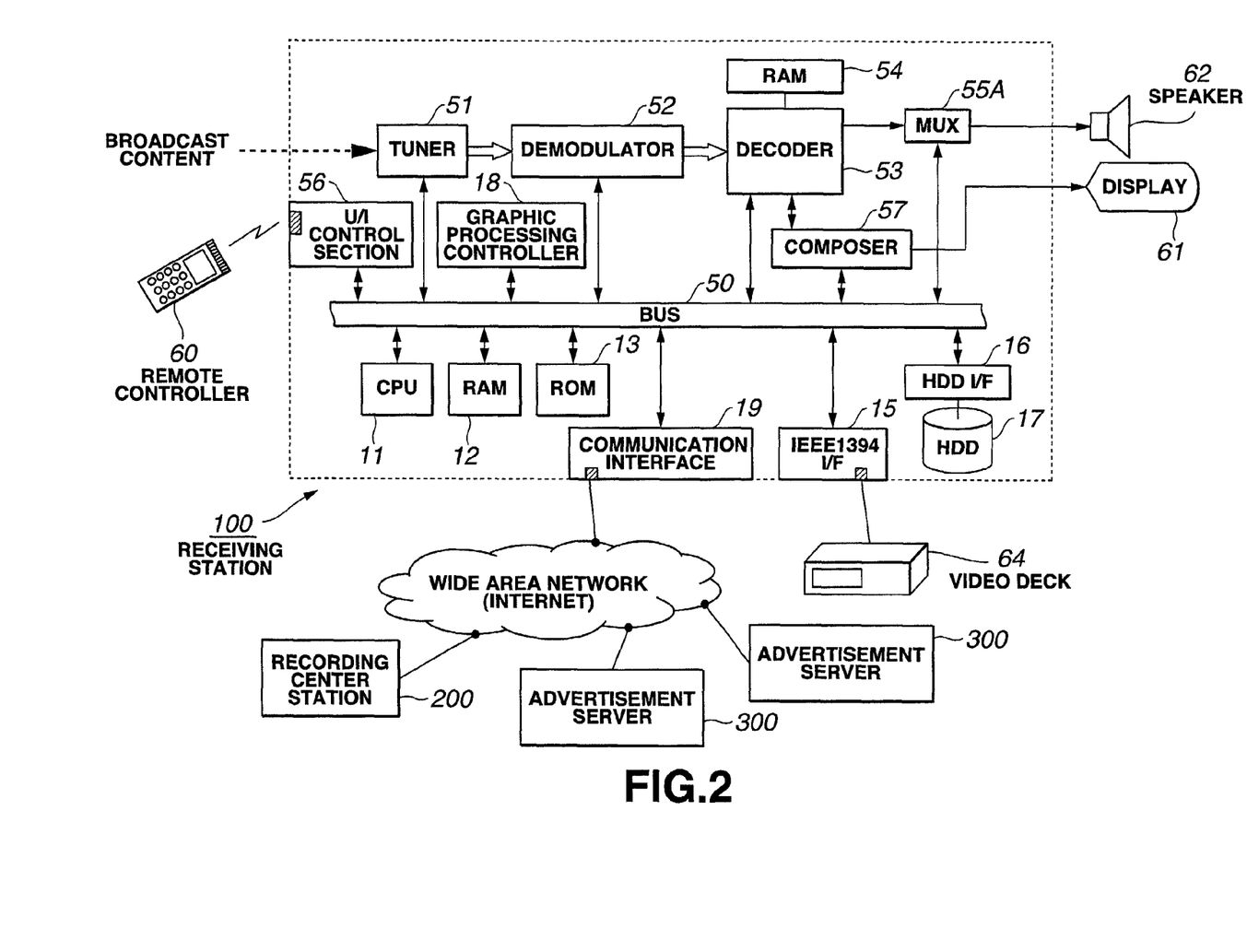
FIG. 2 schematically shows a hardware configuration of a receiving station 100 according to this embodiment.

FIG. 2 schematically shows a hardware configuration of a receiving station 100 according to this embodiment. It is possible to configure the receiving station 100 by integrating it in a television set like a set-top box (STB) installed in an ordinary home.

In the receiving station 100, the CPU (Central Processing Unit) 11 as a main controller connects with each hardware component via a bus 50 for centrally controlling these components. The following describes each component of the content recording and receiving station 100.

A broadcast wave received at an antenna (not shown) is supplied to a tuner 51. The broadcast wave follows a specified format and may include information such as EPG (Electric Program Guide). The broadcast wave can be a surface wave, a satellite wave, wire broadcasting, or a radio wave.

According to an instruction from the CPU 11, the tuner 51 selects a specified channel's broadcast wave for tuning and outputs reception data to a succeeding demodulator 52. The demodulator 52 demodulates digitally modulated reception data. It is possible to change or enhance the configuration of the tuner 11 depending on whether the transmitted broadcast wave is analog or digital.

In the case of digital satellite broadcasting, for example, digital data received and demodulated from the broadcast wave is a transport stream comprising AV data compressed with MPEG2 (Moving Picture Experts Group 2) and data broadcasting data. The AV data provides audio and video information constituting a broadcast content itself The data broadcasting data is attached to the broadcast program itself and includes, say, EPG (Electric Program Guide). The transport stream follows specifications for the "transport layer" in the OSI (Open Systems Interconnection) reference model. For implementing the present invention, AV data is not limited to the MPEG2 format as mentioned above, but may use other formats such as MPEG4, MPEG7, Real System, and Quick Time.

The decoder 53 analyzes this transport stream and separates it into MPEG2compressed AV data and data broadcasting data. The decoder further separates MPEG2compressed realtime AV data into compressed video data and compressed audio data. The decoder reproduces the original video signal from the video data by means of MPEG2expansion. The decoder decodes the audio data according to PCM (Pulse Code Modulation) and synthesizes this data with an additional sound to generate a reproduction audio signal. The decoder 53 may be locally equipped with memory 54 as a work data storage. The reproduced video signal is displayed on a display 61 via a composer 57. The reproduced audio signal is output to a speaker 62 via a MUX 55A. For implementing the present invention, audio data is not limited to the PCM format as mentioned above, but may use other formats such as MPEG AUDIO, Real Audio, and Quick Time.

The decoder 53 transfers the data broadcasting data separated from the transport stream to the CPU 11 via the bus 50. The CPU 11 can use a specific application to process the data broadcasting data and use that data for creating an EPG (Electronic Programming Guide) screen.

According to a request from the CPU 11, the decoder 53 can transfer an MPEG2 stream before expansion or a program content after expansion to the CPU 11 or other devices such as a video deck 64 and an HDD 17 via the bus 50.

A user interface control section 56 is a module for processing user input operations. This section is provided with a control button or switch (not shown) for user's direct manual operations or a function for accepting remote operations from a remote controller 60 via an infrared ray (IR). This section may contain a display panel or an LED indicator (not shown) for displaying the current settings.

The CPU (Central Processing Unit) 11 is a main controller for managing operations of the entire receiving station 100 and can execute various applications on a platform provided from the operating system (OS).

RAM (Random Access Memory) 12 is write-enabled volatile memory used for loading executable program codes for the CPU 11 and writing work data for an executable program. ROM (Read-Only Memory) 13 is write-protected memory for permanently storing control codes for hardware operations and self-diagnostic or initialization programs executed during a power-on sequence for the content recording and receiving station 100.

An IEEE1394 (i-link) interface 15 is a high-speed serial interface capable of sending and receiving data at a rate of several tens of megabytes per second. An IEEE1394 port can be used for connection with IEEE1394-compliant external devices in a daisy-chain or tree fashion. IEEE1394-compliant devices include, say, a video deck 64 for recording or reserving broadcast contents.

A hard disc drive (HDD) 17 is a random-access external storage capable of storing programs and data in specified file formats and provides a large capacity of, say, several tens of gigabytes (or 100 GB or more). The HDD 17 is connected to the bus 50 via a hard disc interface 16. A request from the CPU 11 allows broadcast programs to be saved or recorded in an MPEG2 stream format on the HDD 17.

During a recording operation, an MPEG2 stream before expansion is transferred from the decoder 53 to the HDD 17. The data transfer method is not limited and can be PIO (program IO), DMA (Direct Memory Access), and the like. For reproducing a recorded content, the MPEG2 stream is retrieved from the HDD 17 and is transferred to the decoder 53 via the bus 50. In the same manner as the reception, the decoder separates the stream into compressed video data and compressed audio data. After the MPEG2 expansion, the compressed data is restored to original video and audio data for reproduction.

A graphic processing controller 18 is a dedicated controller for generating computer screens in accordance with drawing instructions issued from the CPU 11 and provides drawing capabilities equivalent to SVGA (Super Video Graphic Array) or XGA (eXtended Graphic Array). The graphic processing controller 18 can draw, say, GUI operation screens and EPG screens.

The composer 57 composes two or more screens. Accordingly, it can combine a reproduction video restored by the decoder 54 using the MPEG2 expansion and computer graphics generated by the graphic processing controller 18.

A communication interface 19 is a peripheral device for connecting the receiving station 100 with an external network such as LAN (Local Area Network). The communication interface is further connected to a wide area network such as Internet via an interconnection device such as a router (not shown).

The CPU 11 processes a recording or reservation command entered by a user from an operation panel of the remote controller 60 or a U/I control section 56 in the receiving station 100 according to the present invention.

The HDD 17 or the video deck 64 monitors the remaining capacity in a recording medium. When the remaining capacity is insufficient for recording a specified program during the program recording or reservation, the CPU 11 is notified of an insufficient medium capacity. In response to this notification, the CPU 11 uses the graphic processing controller 18 to generate a dialog screen for warning of an insufficient storage capacity or medium replacement. Further, the composer 57 overlaps the alarm dialog on a program screen being broadcast.

Even if the alarm dialog is displayed for notifying an insufficient medium capacity, a user may take no action and the reservation time may be reached. Alternatively, a medium may be found to leave an insufficient capacity when the recording time is reached or before the recording starts at a specified time. Further, the HDD 17 or the video deck 64 may malfunction to disable recording. In these cases, the CPU 11 generates a recording substitution request and transfers this request to the recording center station 200 via a wide area network.

The recording substitution request may be an HTTP request in the URL format or a mail message. Alternatively, it may be preferable to use a telephone call to the recording center station 200 via a public telephone line (not shown). It is desirable to have this request include identification information about a program to be recorded and an account or user for the receiving station 100.

Figure 3:
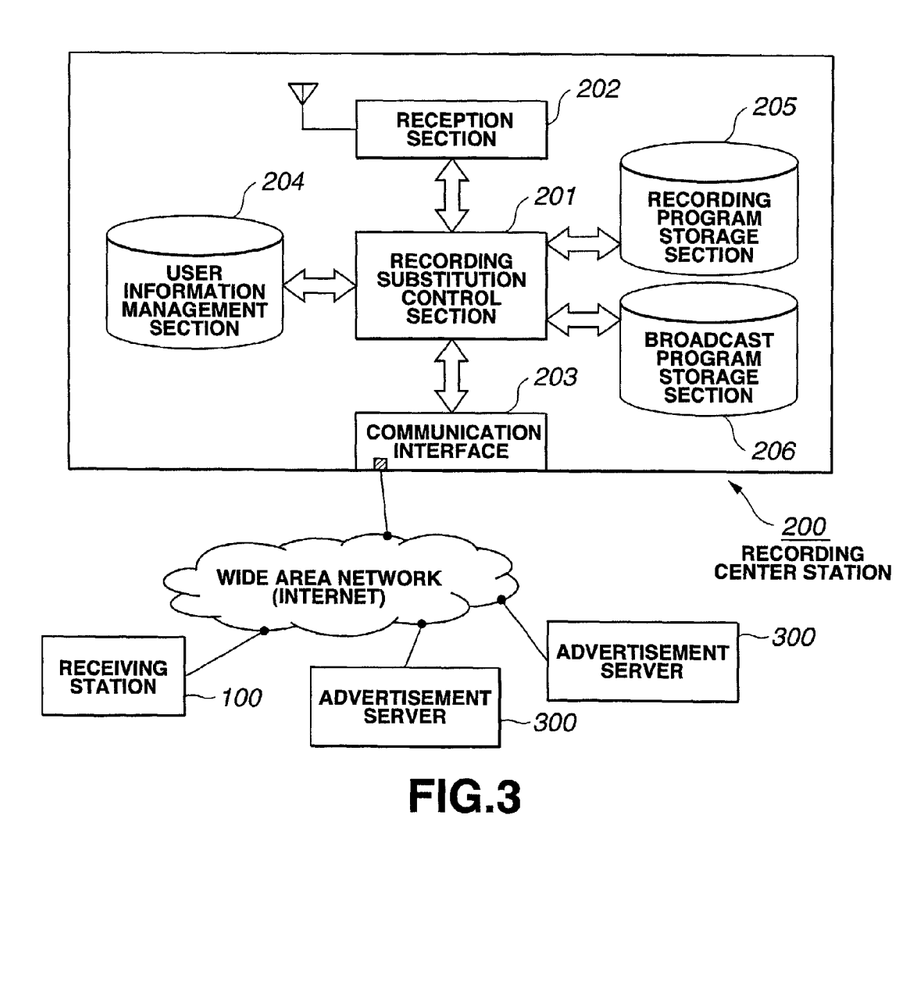
FIG. 3 schematically shows a hardware configuration of a recording center station 200 according to this embodiment.

FIG. 3 schematically shows a hardware configuration of the recording center station 200 according to this embodiment. As shown in this figure, the recording center station 200 comprises a recording substitution control section 201, a reception section 202, a communication interface 203, a user information management section 204, a recording program storage section 205, and a broadcast program storage section 206.

The reception section 202 selects a broadcast wave generated from the broadcasting station 10 and demodulates received data. More preferably, the reception section 202 can simultaneously select a plurality of broadcast waves (multiple decoding).

The communication interface 203 is a peripheral device for connecting the recording center station 200 to an external network. Accordingly, the recording center station 200 can receive a recording substitution request from the receiving station 100 via the communication interface 203 or retrieve an advertising content from an advertisement server on the network.

The recording substitution control section 201 responds to a recording substitution request received via the communication interface 203 and centrally controls operations in the recording center station 200.

When receiving a recording substitution request from the receiving station 100 associated with a given user, the recording substitution control section 201 first accesses a user information database stored in the user information management section 204. It then checks user's validity (namely, whether the user is already registered for the recording center station 200) or obtains user attribute information such as user's hobbies, tastes, types of preferred advertisement media, and the like.

The recording substitution control section 201 analyzes the content of the recording substitution request and determines for which broadcast program the user requests the recording substitution. The recording substitution control section receives the corresponding program content via the reception section 202, associates the received content with identification information of the requesting user, and stores that program in the recording program storage section 205.

When a single recording center station 200 provides many users or receiving stations with recording substitution services, many users may issue recording substitution requests to one broadcast program. In this case, receiving and saving the broadcast program does not necessarily require association with the requesting user identification information. The recording center station 200 may temporarily record all broadcast programs from all receivable broadcasting stations independently of whether a recording substitution request is available. It may be preferable to discard programs for which no recording substitution request was issued thereafter from the recording program storage section 205. It may be also preferable to appropriately discard a program content for which all recording substitution requests have been processed from the recording program storage section 205.

Further, the recording substitution control section 201 may insert advertising information into a recorded program content. It may be preferable to insert advertising information in a recorded content and appropriate part of the advertising proceeds to the recording service charge for a discount. It may be also preferable to replace a commercial message inserted in the broadcast program with an advertising content or insert an advertising content in addition to the commercial message. Further, it may be preferable to analyze the user profile based on the contents of recording-requested programs, select advertising contents most appropriate for the user, and attach the selected advertising contents to a recorded content.

Advertising information is provided from an advertisement server 300, say, on an external network. The recording center station 200 can specify advertising information to be used, say, in a URL (Uniform Resource Locator) format. It may be also preferable to use file transfer or other means for periodically or irregularly providing the recording center station 200 with advertising contents an advertiser wants to promote.

There can be any forms of distributing program contents substitutionally recorded by the recording center station 200 to the requesting receiving station 100. It may be preferable to use a file transfer via an external network or distribution means such as forwarding by mail and a home delivery service by storing recorded programs on recording media such as CD, DVD, video tapes, and the like. It may be also preferable to distribute recorded contents daily or weekly instead of distributing them in units of recorded programs.

Figure 4:
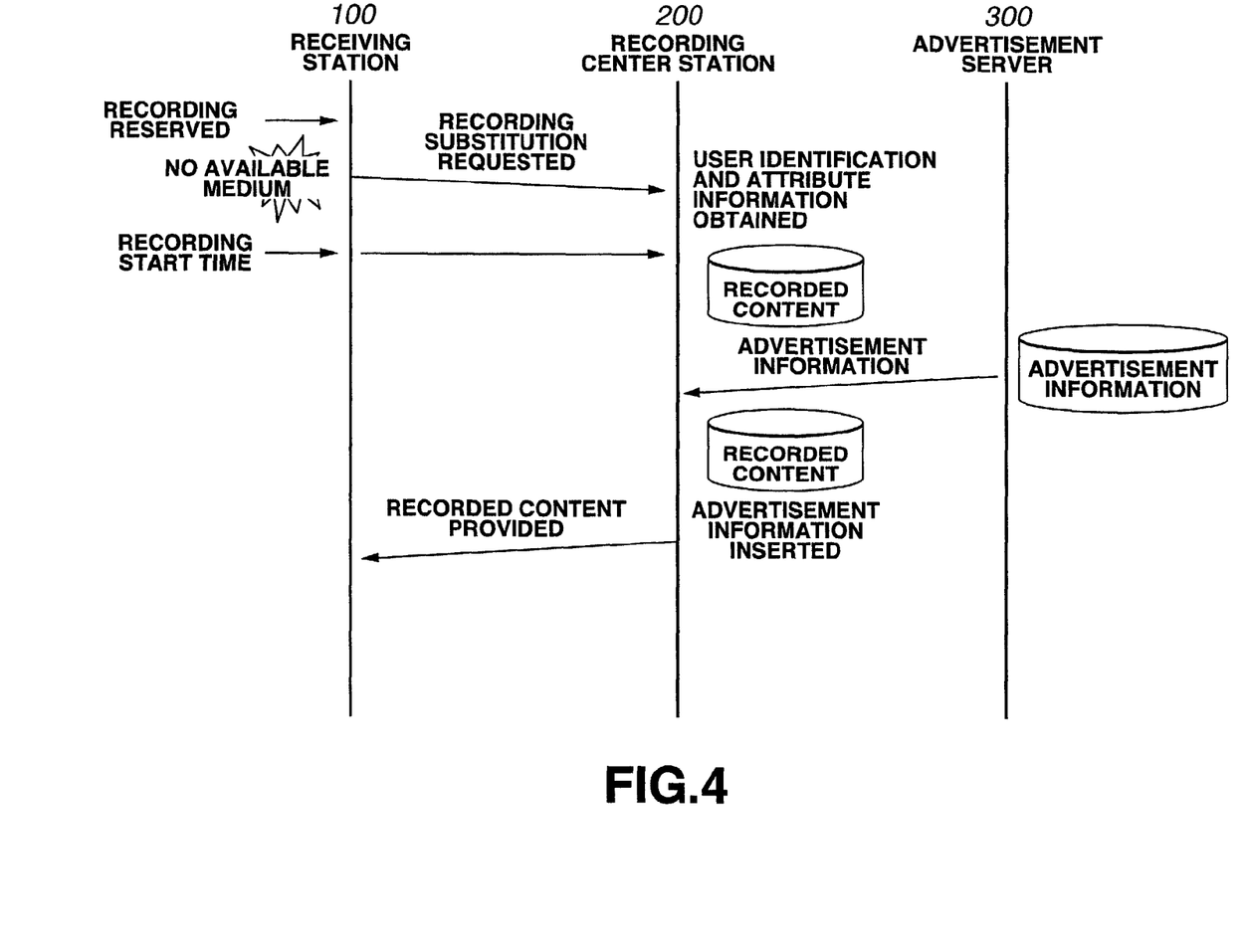
FIG. 4 is a chart showing a processing procedure for recording substitution in the recording center station 200.

FIG. 4 is a chart showing a processing procedure for recording substitution in the recording center station 200.

When accepting a recording reservation from the user, the receiving station 100 checks if a recording medium contains a free area large enough to record the program. This recording medium is equivalent to the hard disc drive 17 or a video tape mounted on the video deck 64.

When the receiving station 100 determines that the medium leaves no free area large enough to record the reserved program, the receiving station sends a recording substitution request to the recording center station 200.

The recording substitution request may be transmitted in any forms such as electronic mail, an HTTP request, and a telephone call via a public telephone line. It is more preferable to have this request include requesting user identification information and program identification information for specifying recorded programs.

When receiving the recording substitution request, the recording center station 200 retrieves the user identification information from the request. The recording center station inquires the user information management section 204 therein whether the user is valid. When the user is determined to be valid, namely authenticated to be provided with recording substitution services, the recording center station retrieves the user attribute information describing user's hobbies and tastes from the user information management section 204. The recording center station further obtains the advertising information appropriate for the user attribute information from the external advertisement server 300.

When the recording start time is reached, the recording center station 200 records the requested program and stores it in the recording program storage section 205. As mentioned above, however, the recording center station 200 may temporarily record all broadcast programs from all receivable broadcasting stations independently of whether a recording substitution request is available.

The recording center station 200 establishes correspondence between each program content stored in the recording program storage section 205 and the requesting user. At this time, the recording center station inserts advertising information matching the requesting user's attribute information into the recorded program content.

Figure 5:
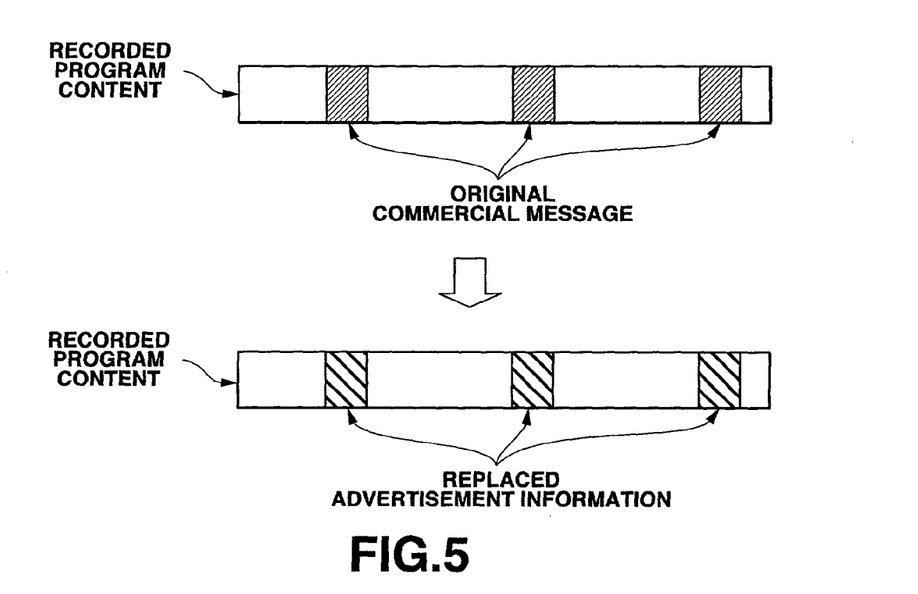
FIG. 5 illustrates how advertising information is inserted into a recorded program content.
Figure 6:
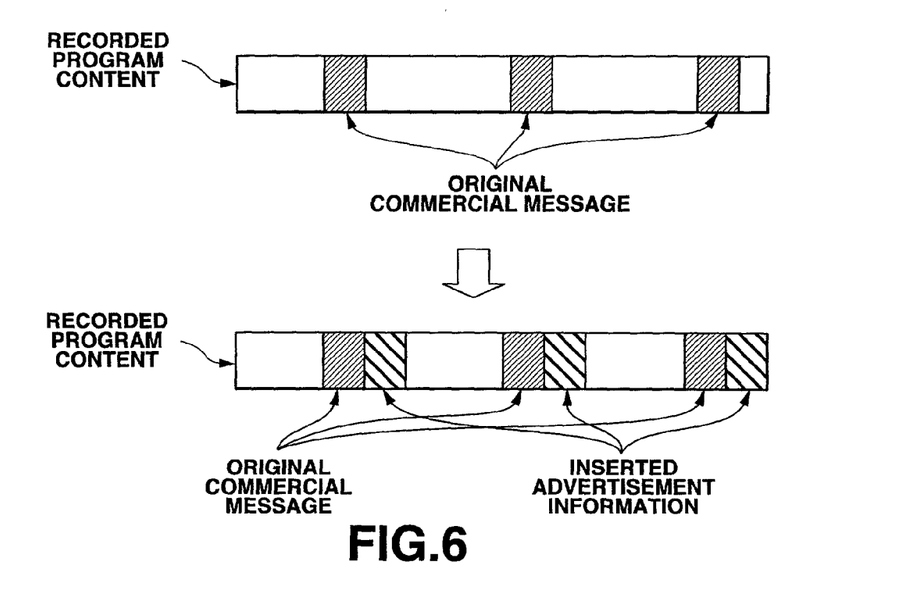
FIG. 6 illustrates how advertising information is inserted into a recorded program content.
Figure 7:
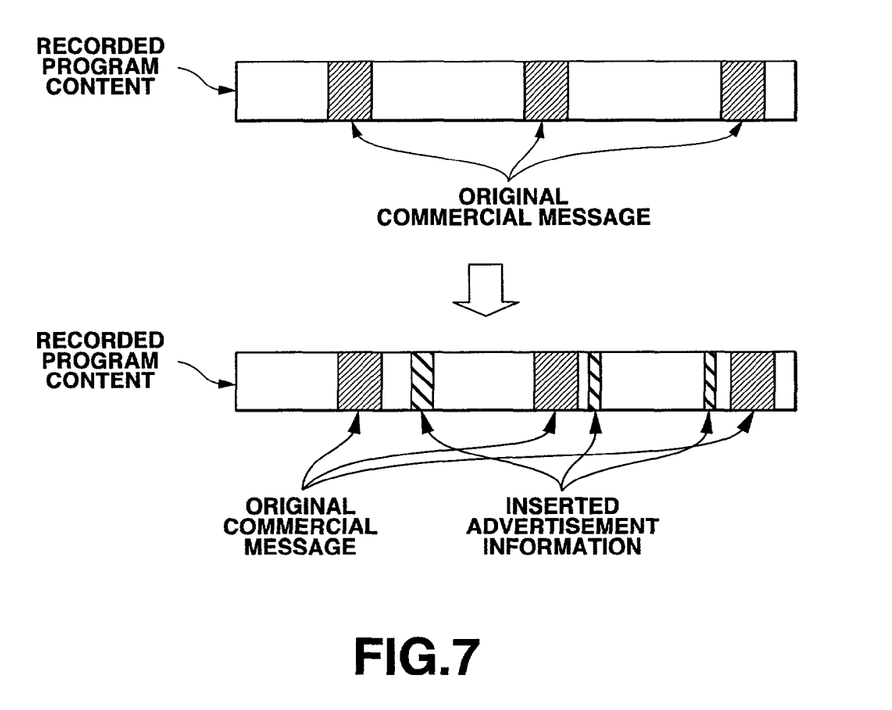
FIG. 7 illustrates how advertising information is inserted into a recorded program content.

The advertising information can be inserted in any forms. For example, the advertising information may replace a commercial message in the program content (see FIG. 5). The advertising information may be inserted before or after a commercial message (see FIG. 6). Alternatively, the advertising information may be inserted independently of commercial messages (see FIG. 7).

The recorded program content with the advertising information inserted therein is saved in the broadcast program storage section 206 in correspondence with the requesting user identification information. In other words, a broadcast program content is common to users who requested recording substitution of the same program. By contrast, a program content with the advertising information inserted therein is customized for each user attribute.

Finally, the recording center station 200 distributes the substitutionally recorded program content to the requesting receiving station 100. There can be any forms of distributing program contents. It may be preferable to use a file transfer via an external network or distribution means such as forwarding by mail and a home delivery service by storing recorded programs on recording media such as CD, DVD, video tapes, and the like. It may be also preferable to distribute recorded contents daily or weekly instead of distributing them in units of recorded programs. It is also possible to provide a recording substitution service by means of a telephone and distribute recording media such as video tapes without using a system in which royalties on a copyright are paid to a content owner.

While there have been described specific preferred embodiments of the present invention, it is to be distinctly understood that the present invention is not limited thereto but may be otherwise variously embodied within the spirit and scope of the invention. Namely, it is intended that the present invention shall be disclosed as illustrative and not in a limiting sense. The scope of the present invention is therefore to be determined solely by the appended claims.

What is claimed is:

1. A recording system for recording and/or reserving a program, comprising:
   receiving means for receiving, via unidirectional communication, the program from a distribution center external to the recording system;
   means for accepting a request to record and/or reserve the program;
   local storage means for recording the program;
   connection means for connecting, via Internet, with an external device which is external to the recording system, the external device separately receiving the program via unidirectional communication from the distribution center independently of the recording system;
   determination means for determining a failure in the recording system; and
   controller automatically issuing a recording substitution request to the external device, via the Internet by said connection means, only in response to said determination means determining the failure without input from a user, wherein the external device records the program receiving from the distribution center upon receipt of the recording substitution request.

2. The recording system according to claim 1, wherein said determination means generates a negative result when a remaining capacity of said storage means is not sufficient for recording a program requested to be recorded and/or reserved.

3. The recording system according to claim 1,
   wherein the external device including user information management means and a recording substitution means; and
   said user information management means for storing user information about each requesting origin,
   wherein the recording substitution means obtains advertising information appropriate for a user attribute of the requesting origin via said connection means and wherein the recording substitution means configured to one of (a) inserts said advertising information in a recorded program stored in the external device in addition to original commercial information included in the recorded program and (b) substitutes said advertising information for the original commercial information included in the recorded program.

4. A recording substitution system for substitutionally recording a program from a distribution station, comprising:
   connection means for connecting via Internet with external devices which are external to the recording substitution system, the external devices including at least recording devices;
   means for receiving the program from the distribution station via unidirectional communication;
   first storage means for recording program content of the program;
   second storage means for storing the program content with advertising information selected for at least one of the recording devices;
   recording substitution means for responding to reception of a recording substitution request from at least one of the recording devices which has experienced a failure within the recording device via said connection means and for receiving and recording the program content, corresponding to the request, in said first storage means; and
   user information management means for storing user information about each requesting origin, wherein said recording substitution means obtains said advertising information appropriate for a user attribute of the requesting origin from another external device via the Internet by said connection means and wherein said recording substitution means configured to one of (a) stores the recorded program content from the first storage means and said advertising information in the second storage means, said advertising information stored as an insert into the recorded program content in addition to original commercial information included in the recorded program content and (b) stores the recorded program content from the first storage means and said advertising information in the second storage means, said advertising information stored as a substitute for the original commercial information included in the recorded program content.

5. The recording substitution system according to claim 4, wherein said recording substitution means can receive recording substitution requests from a plurality of external devices and records a program corresponding to a requesting origin.

6. The recording substitution system according to claim 4 further comprising user information management means for storing user information about each requesting origin, wherein said recording substitution means records a program in a format appropriate for a user attribute of the requesting origin.

7. A recording system for recording and/or reserving a program, comprising:
 a receiving portion configured to receive the program, via unidirectional communication, from a distribution center external to the recording system;
 a request accepting portion configured to accept a request to record and/or reserve the program;
 a local storage portion configured to record the program;
 a connection portion configured to connect, via Internet with an external storage device external to the recording system, the external storage device separately receives the program via the unidirectional communication from the distribution center independently of the recording system;
 a determination portion configured to determine a failure in the recording system; and
 a controller portion configured to automatically issue a recording substitution request, to the external storage device via the Internet through the connection portion, only when the determination portion determines the failure without input from a user, wherein upon receiving the recording substitution request the external storage device records the program received from the distribution center.

8. A recording substitution system for substitutionally recording a program from a distribution station, comprising:
 receiving portion configured to receive, via unidirectional communication, the program from the distribution station;
 a first storage portion configured to record program content of the program;
 a second storage portion configured to store the program content with advertising content which is received, via Internet, independent of the distribution station; included in the recorded program and (b) substitutes said advertising information for the original commercial information included in the recorded program.

9. The recording system according to claim 7,
wherein the external device including user information management means and a recording substitution means; and
said user information management means for storing user information about each requesting origin,
wherein the recording substitution means obtains advertising information appropriate for a user attribute of the requesting origin via said connection means and wherein the recording substitution means configured to one of (a) inserts said advertising information in a recorded program stored in the external device in addition to original commercial information included in the recorded program and (b) substitutes said advertising information for the original commercial information included in the recorded program.

* * * * *